United States Patent [19]

Nylund

[11] Patent Number: 4,695,426
[45] Date of Patent: Sep. 22, 1987

[54] SPACER FOR FUEL RODS

[75] Inventor: Olov Nylund, Västerås, Sweden

[73] Assignee: Aktiebolaget ASEA-ATOM, Västerås, Sweden

[21] Appl. No.: 882,362

[22] Filed: Jul. 7, 1986

[30] Foreign Application Priority Data

Jul. 9, 1985 [SE] Sweden .............................. 8503403

[51] Int. Cl.⁴ .............................................. G21C 3/34
[52] U.S. Cl. ................... 376/441; 376/442; 376/446; 376/462; 29/400 N; 29/723
[58] Field of Search ............... 376/441, 442, 438, 439, 376/446, 462, 434, 364; 29/400 N, 402.19, 450, 723

[56] References Cited

U.S. PATENT DOCUMENTS 3,405,033 10/1968 Widell .................................. 376/442
3,457,140 7/1969 Glandin ............................... 376/442
3,833,471 9/1974 Chetter ................................ 376/442
4,190,494 2/1980 Olsson ................................. 376/442
4,489,038 12/1984 Nylund ............................... 376/442

Primary Examiner—Donald P. Walsh
Attorney, Agent, or Firm—Watson, Cole, Grindle & Watson

[57] ABSTRACT

The invention relates to a spacer arranged to retain and fix elongated fuel rods into bundles insertable into a nuclear reactor fuel assembly, said spacer being of a zirconium alloy having a low neutron absorption. To counteract play and hence wear in case of increasing burnup when the springs relax and the rod diameter is reduced by shrinkage, the spacer is made with different textures in the springs (2, 3) and the surrounding structure (1, 6). The difference in texture gives the springs a great axial irradiation growth and the surrounding structure a small axial irradiation growth, which contributes to a remaining deflection tendency of the springs in relation to the surrounding structure during the life of the fuel assembly.

10 Claims, 6 Drawing Figures

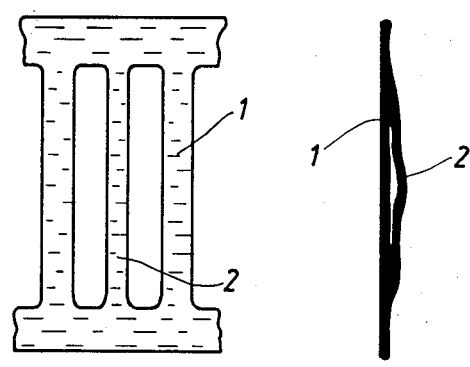
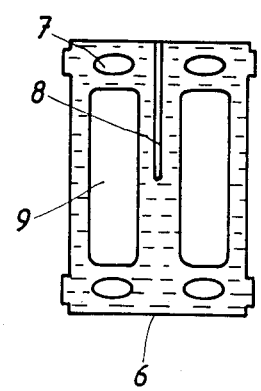
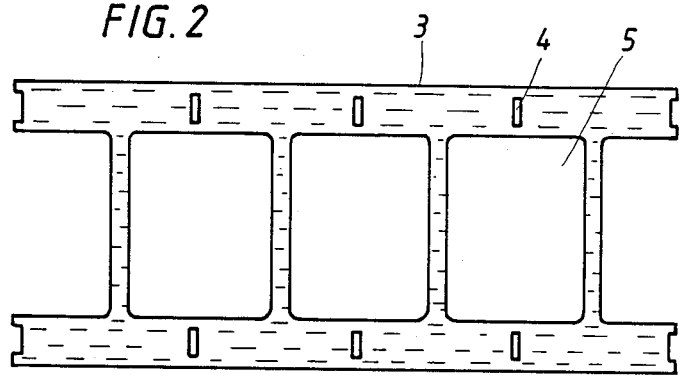
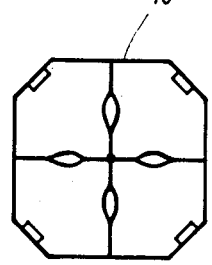
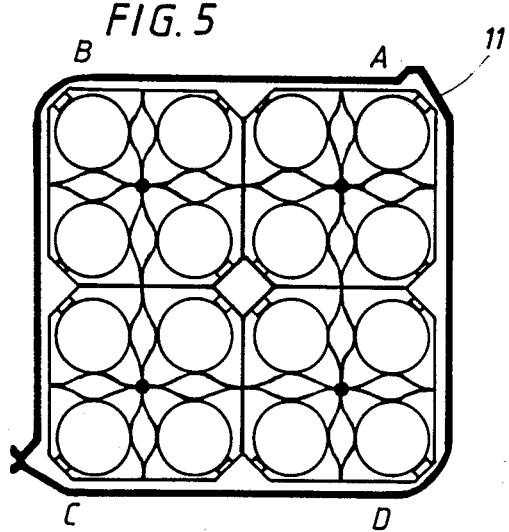
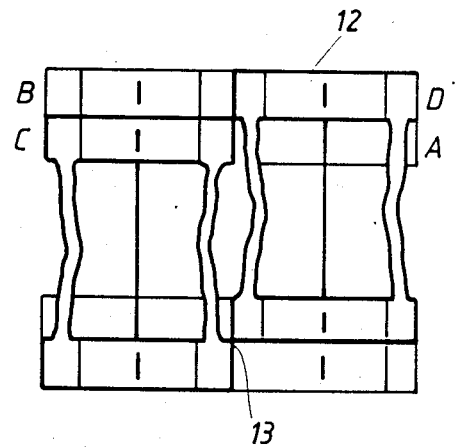

SPACER FOR FUEL RODS

TECHNICAL FIELD

The present invention relates to a spacer for fuel rods used in a fuel assembly of a nuclear reactor.

BACKGROUND ART

A very large number of known embodiments of spacers exists, which is due to the fact that, in spite of their simple design, the spacers in many respects have to fulfill very heavy demands. The spacer must have a low flow resistance with respect to the coolant flowing through the fuel assembly along the fuel rods, and good resilient properties. The influence of the spacer on the neutron flux in the fuel assembly is also of considerable importance. It is difficult to find a material which at the same time has good resilient properties and little influence on the neutron flux, since almost all materials which have a small influence on the neutron flux also have poor resilient properties and therefore are not suitable for use in a spacer.

DISCLOSURE OF THE INVENTION

The object of the present invention is to improve the resilient properties for a spacer of a zirconium-based alloy. This is achieved, according to the invention, by a spacer which includes spring elements having a texture which provides a great axial irradiation growth and surrounding structure elements having a texture which provides a small axial irradiation growth. The zirconium-based alloy preferably consists of a zirconium-tin alloy. There can be used, for example, the zirconium-based alloys known under the trade names Zircaloy 2 and Zircaloy 4, the contents of which of alloying materials lie within the limits 1.2–1.7% for tin, 0.07–0.24% for iron, 0.05–0.15% for chromium, 0–0.08% for nickel, 0.09–0.16% for oxygen, the balance being zirconium and impurities normally occurring in reactor quality zirconium. Zircaloy 2 contains 1.2–1.7% tin, 0.07–0.20% iron, 0.05–0.15% chromium, 0.03–0.08% nickel and 0.09–0.16% oxygen. Zircaloy 4 contains 1.2–1.7% tin, 0.18–0.24% iron, 0.07–0.13% chromium and 0.09–0.16% oxygen. All the percentages given relate to percentage by weight.

BRIEF DESCRIPTION OF THE DRAWING

Embodiments of the invention will be described below with reference to the accompanying drawing, wherein FIG. 1 shows part of a surrounding structure element with spring elements, FIG. 2 shows a spring element, FIG. 3 shows a structure element, FIG. 4 shows how spring elements and structure elements together form a "supercell", and FIGS. 5 and 6 show how four "supercells" have been joined together.

DESCRIPTION OF THE PREFERRED EMBODIMENT

With increasing burnup, using spacers wholly made of Zircaloy, there is a risk of play, and hence wear, owing to the fact that the springs relax and the rod diameter is diminished by shrinkage. By intentionally forming the spacer with different texture in the springs 2 and the surrounding structure 1, in which the springs 2 are clamped or included, such a difference in irradiation growth can be obtained that the springs 2 will have a considerable tendency to deflection, corresponding to a few tenths of a millimeter during the life of the assembly. In this way the engagement between the spring and the fuel rod is ensured also in the case of considerable burnup. To a certain extent such an effect can be obtained also without taking special measures by a certain cold working effect when the spring is pressed out.

For a normally designed Zircaloy spacer, where spring elements and surrounding structure elements are included in the same tape-formed sheet material (1, 2) to be assembled crosswise, for example, for the formation of grids, it would be possible to attain the desired difference in growth by selective heat treatment by means of beta-quenching of the surrounding structure 1 and alfa+beta-quenching at the lowest possible temperature of the springs 2. In such a process, heating by radiation, for example infrared or laser, is utilized.

Another method of obtaining a deflection effect is to perform a heat treatment selectively across the cross-section, so that the outside of the spring has an alfa+beta structure with a great growth tendency and its inner side a pure beta-structure with a small growth tendency by analogy with a bimetallic spring.

If different sheet materials are used, the spring elements and the structure elements can be provided with different texture by heat treatment. The spring elements 3 are taken from a tape-formed material with a great irradiation growth and are provided with passages 5 and recesses 4. The structure elements 6 having a texture with a small axial irradiation growth may consist of two punched-out sheet parts, cooperating crosswise, having fixing supports 7 formed from oval slits, cooperating slits 8 and passages 9. The spring elements 3 are caused to surround and are then connected to the structure elements, which are put together crosswise, to form a "supercell" 10.

If the spacer is designed so that the spring and the surrounding structure can be made from different sheets, different rolling directions and degrees of cold working could also be utilized.

FIG. 5 shows a possible embodiment of a spacer 11 which is also assumed to have good thermohydraulic properties. The embodiment can be regarded as a hybrid between egg box technique and cell technique where four cells, assembled crosswise, form a larger unit. A general requirement is that the thickness of the sheet is 0.7 mm without the fall of pressure becoming too extensive. The fixing supports on top and bottom are pressed out towards the sides without any stiffening intermediate structure. Oval slits 7 in the sheet blank between the supports to be formed result in softer flow paths. By joining the four "supercells" 10, 11, 12 together axially displaced, portions having twice the sheet thickness are avoided and the flow blocks are distributed in different planes. When joining together the cells axially displaced, a butt weld is located at 13.

I claim:

1. A spacer for retaining and fixing elongated fuel rods into bundles insertable into a fuel assembly of a nuclear reactor, said spacer being made of a zirconium alloy having a low neutron absorption and comprising spring elements and surrounding structure elements, the spring elements being intentionally given a texture which provides a certain axial irradiation growth and the surrounding structure elements being intentionally given a texture having a smaller axial irradiation growth than that for said spring elements.

2. A spacer according to claim 1, wherein said spring elements and surrounding structure elements are included in the same sheet material, said spring elements, by selective heat treatment, having been given a texture different from that of the surrounding structure elements with a greater axial irradiation growth than the corresponding growth of the surrounding structure elements.

3. A spacer according to claim 1, wherein, by selective heat treatment of different sides of said spring elements, one side of said spring elements has been given a texture with a certain axial irradiation growth and the other side has been given a texture with a smaller irradiation growth than that for the first side.

4. A spacer according to claim 1, wherein when said spring elements and surrounding structure elements are not included in the same sheet material, said spring elements have been given a texture with a greater axial irradiation growth than the corresponding growth for the surrounding structure elements by means of a rolling direction and cold working, with or without further heat treatment, which are different from those of the surrounding structure elements.

5. A spacer according to claim 1, wherein when said spring elements and surrounding structure elements are not included in the same sheet material, said spring elements have been given a texture with a greater axial irradiation growth than the corresponding growth for the surrounding structure elements by means of a heat treatment different from that of the surrounding structure elements.

6. A spacer according to claim 1, wherein said spring elements have been connected to the surrounding structure elements after having been given a texture, by means of heat treatment, which is different from that of the surrounding structure elements for obtaining a difference in irradiation growth.

7. A spacer according to claim 2, wherein said surrounding structure elements with spring elements from a tape-formed material are joined together crosswise to form a grid for retaining and fixing the fuel rods.

8. A spacer according to claim 4, wherein said spring elements consist of a tape-formed material having punched-out passages and recesses surrounding the structure elements which are arranged crosswise, said structure elements exhibiting passages, cooperating slits and fixing supports made from oval slits.

9. A spacer according to claim 8, wherein said structure elements which are composed crosswise are brought together and joined, surrounded by the spring elements, to form a larger unit.

10. A spacer according to claim 8, wherein when forming the larger unit, the surrounding spring elements are displaced axially in order to reduce the flow resistance at the joint.

* * * * *